US005852766A

United States Patent [19]

Chadwick et al.

[11] Patent Number: 5,852,766

[45] Date of Patent: Dec. 22, 1998

[54] METHOD FOR ACCURATE REPLICATION OF SHAPED ARTICLES USING SINTERABLE POWDERS

[75] Inventors: Thomas Chadwick, Nipomo; Ron DeMoss, Los Osos, both of Calif.

[73] Assignee: Den-Mat Corporation, Santa Maria, Calif.

[21] Appl. No.: 82,546

[22] Filed: May 21, 1998

[51] Int. Cl.[6] .............................. B22F 3/10; A61C 13/08

[52] U.S. Cl. ................................ 419/2; 419/36; 264/434

[58] Field of Search .......................... 419/2, 36; 264/434

[56] References Cited

U.S. PATENT DOCUMENTS 5,270,513 12/1993 Sergent ................................ 219/69.12
5,362,438 11/1994 van der Zel .............................. 419/28
5,776,382 7/1998 Kim et al. ................................ 264/16

*Primary Examiner*—Daniel J. Jenkins
*Attorney, Agent, or Firm*—Dorsey & Whitney

[57] ABSTRACT

Shaped articles such as dental onlays and inlays having at least one surface adapted to mate with a mating surface of a second shaped article are produced by a procedure which includes immersing a swellable polymer casting mold in a swelling agent system to swell such casting mold to an extent which compensates for the shrinkage which occurs when a sinterable powder compact made therein or in a solid replica thereof, is heated.

13 Claims, 1 Drawing Sheet

METHOD FOR ACCURATE REPLICATION OF SHAPED ARTICLES USING SINTERABLE POWDERS

FIELD OF THE INVENTION

This invention relates generally to the fabrication of dimensionally accurate replicas of irregularly shaped articles having mating surfaces intended for bonding to corresponding surfaces of a second shaped article, exemplified by dental onlays and inlays.

BACKGROUND OF THE INVENTION

The fabrication of shaped articles by sintering powder compacts, whether formed by die pressing, slip casting, or injection molding, involves a series of certain basic steps. The raw sinterable powder, such as a ceramic or metal powder is first mixed with a binder and often a suitable solvent. The binder-powder mixture is then formed or shaped and any solvent, if present, is removed. In the final step the powder compact is heated under conditions which lead to elimination of the binder material and any solvent that may have been present. Continued heating results in the consolidation of the individual grains of the sinterable powder, such as ceramic, plastic or metal powder and the creation of a monolithic object, which is free of voids.

Although processes such as die pressing, slip casting, and injection molding are capable of delivering finished objects of great complexity in a bewildering array of materials, they all suffer from one major drawback. These processes all involve forming compacted powders into complex shapes. Powder compacts of these materials invariably have numerous voids between the individual constituent powder grains of the compacted powder. Typically such compacted powder objects contain only from about 40% to 65% solids by volume before heating. Voids amounting to 35% to 60% constitute the remainder. When such objects are heated, the voids are eliminated, and the powder compact object undergoes linear shrinkage on the order of 15%–25%.

When an accurate replica of a shaped article is sought in terms of both dimensional size and proportional configuration, it is necessary to oversize the powder compact to an extent sufficient to offset the shrinkage which occurs during the heating of the powder compact, which is the last step of the procedure.

By way of illustration, if a precise dimensional replica of a shaped article is desired when using an injection molding process, the injection mold die cavities must be enlarged by an amount equal to the amount of shrinkage that will take place when the molded powder is heated. The same type of enlargement must be made to compensate for shrinkage on heating in all powder forming processes.

The dimensional compensation needed for accurate replica of shaped articles can be provided by hand enlargement of a mold, produced from the article to be replicated. However, this solution to the problem is obviously labor intensive and requires great skill to produce a proportionately accurate oversized mold. Since the careful crafting of the oversized molds is obviously time consuming and costly, the use of this technique is usually limited, either to replicas where the high cost of the finished article is not a deterrent or to the production of large numbers of identically shaped articles, as distinguished from manufacturing situations where only a few relatively low valued replicas are to be made. In addition to being highly labor intensive, the accuracy of sculpting to provide shrinkage compensation for complex objects is completely dependent upon the skill of the artisan. As observed by Randall German in the book "Powder Injection Molding", p.255, tool design can involve using the " . . . costly trial-and -error approach."

The problem of shrinkage resulting from heating can be avoided, in some instances if it is acceptable for the replicated article to be produced from materials, which exhibit only a slight amount of shrinkage. For example molten metals or glass can be cast in a mold with very little resulting shrinkage, but there are only a very limited number of circumstances where these materials are acceptable for the final replicated article. There also have been attempts to develop special ceramics which undergo a phase change and some degree of expansion during heating to thereby counteract the volume contraction which would otherwise result from the elimination of voids. Unfortunately these materials have found only limited use, because other essential properties of the final product, such as thermal expansion, strength, fracture toughness, etc. are compromised.

The difficulties described above present an especially difficult challenge in cases where the final article must be of the exact size and shape, which includes a mating surface, for bonding to a second shaped article having a surface corresponding to the mating surface of the original. This difficulty is best illustrated by dental onlays and inlays, which must closely mate to a prepared surface of a natural tooth, which is to be restored. Open spaces and discontinuities between the mating surfaces present an unacceptable risk of invasion by bacteria resulting in further erosion and even loss of the natural tooth undergoing restoration.

DESCRIPTION OF THE PRIOR ART

Replicating shaped articles by molding a sinterable powder into the shape of the article to be replicated followed by heating at high temperature to produce strength and structural integrity is a technique that has been known for centuries. See for example F. H. Norton, "Fine Ceramics—Technology and Applications" Robert E. Kreiger Publishing Co., Malaba, Fla., 1987, pp. 101–129; "Slip-casting of Non-clay Materials" Rado, P. Trans. J. Brit. Ceramic Soc., 72 (7), 291–297 (1973) and "Properties of Slip-Cast Transformation-Toughened Beta"—$Al_2O_3/ZrO_2$ Composites" D. J. Green and M. G. Metcalf Am. Ceram. Soc. Bull., 63 [6] 803–820 (1984).

Artists often wish to produce enlarged versions of works of art. Pantographs are commonly used for enlarging two-dimensional works of art. Very complex three-dimensional pantographs for producing enlarged replicas of three-dimensional works have also been developed but these are strictly mechanical approaches to the creation of enlarged shaped articles. While these methods may be acceptable for producing molds for the production of large volume items, where precise replica is not essential, such as toys, they do not have sufficient accuracy for the production of replicas where accuracy is essential such as for the production of dental onlays and inlays.

The production of dental inlays and onlays is especially challenging. Hand sculpting of the needed enlargement of the model is the conventional technique for compensating for the shrinkage experienced in the firing of dental onlay and inlay slips. This method has many obvious drawbacks due to the skill and amount of labor required of the artisan to obtain a satisfactory degree of accuracy in producing the onlay or inlay itself and especially in regard to the mating surface by which the onlay or inlay is to bonded to the prepared surface of the natural tooth.

SUMMARY OF THE INVENTION

It has now been found that a variety of different polymers can be made to swell to a precise predetermined degree and without dissolving, by immersion in a properly formulated swelling agent system.

Dimensionally accurate replicas of shaped articles, using any of the conventional sinterable powders in a powder sintering process can be accomplished by a very simple technique involving the selection of a swellable polymer which can made to increase in size in a reproducible manner and to a pre-selected extent, by immersion in an appropriate swelling agent system. The selection of a swelling agent system and polymer which can be made to swell to essentially the same extent as the shrinkage resulting from the heating of the sinterable powder selected for the replica, allows the fabrication of one or even large numbers of dimensionally accurate replicas of shaped articles, without the necessity for time consuming and costly hand labor.

This invention allows the preparation of dental onlays and inlays having mating surfaces which can bond closely to a corresponding prepared surface of a natural tooth undergoing restoration with a very high degree of accuracy. The procedure is relatively simple and does not require a high level of craftsmanship nor is it especially time consuming in comparison with conventional procedures. This method begins with the preparation of a swellable polymer model of a prepared tooth, which is then swelled to a predetermined extent and then used to produce an enlarged investment cast die. The enlarged stone casting copy of the original stone cast is used to prepare a wax onlay or inlay which can be trimmed or sculpted by hand to produce the occlusal surface tooth face appearance. Next a slip casting mold of the wax model is produced using conventional lost wax fabrication techniques. The casting mold thus produced is filled with a sinterable composition, such as an aqueous zirconia composition to produce a slip casting which, when removed from the mold and fired, will solidify and shrink to size of the original model while retaining a high degree of accuracy in both the proportional and size relationships to the original model and especially in regard to the mating surface.

Figure 1:
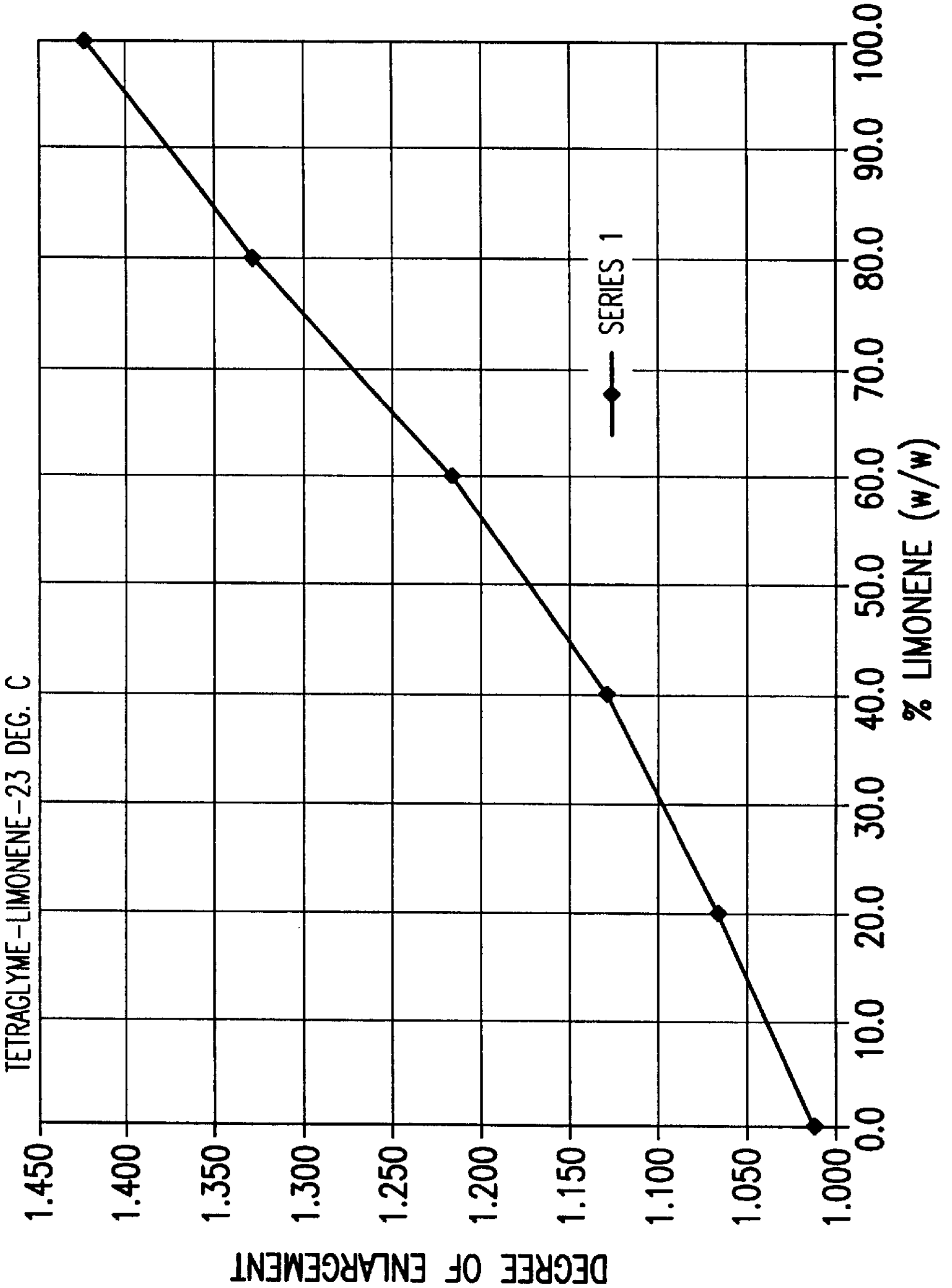
FIG. 1 is a graphical representation of the swelling ratios of a certain RTV silicone elastomer when immersed in swelling agents comprised of mixtures of tetraglyme and limonene in various concentrations.

DETAILED DESCRIPTION OF THE INVENTION i. The sinterable material

This invention is ideally suited to the accurate reproduction of shaped articles from a variety of different sinterable materials. While the method of this invention can be used to replicate many different kinds of shaped articles, such as works of art, it is especially suited to the production of dental restorations in the form of dental onlays and inlays.

The first step in the practice of this invention is the selection of the sinterable powder to be used for production of the desired solid replica. This step is followed by a determination of theprecise amount of shrinkage, which will occur when the selected sinterable material is fired under specific conditions in accordance with a specific firing schedule. This shrinkage factor is hereinafter referred to as the "coefficient of shrinkage."

The shrinkage, which will take place upon heating a powder compact of a sinterable substance, will be influenced primarily by the following factors:

i) The particle size(s) of the sinterable powder.

ii) The degree of packing (bulk density) of the sinterable powder.

iii) The time, duration and temperature at which the powder compact (molded sinterable powder) is heated, and iv) The chemical composition and constituents of the sinterable powder.

The accuracy of the determination of the coefficient of shrinkage plays a major role in determining the dimensional and proportional accuracy of the final solid replica.

Any sinterable powder can be used in the practice of this invention. Among the sinterable powders that are useful are: clay and clay containing ceramics, dental porcelain, glass, alumina, fused silica, beryllia, urania, calcia, magnesia, spinel, calcium fluoride, magnesium fluoride, titanium nitride, zirconium boride, silicon carbide, titanium carbide and cermets as well as metal powders, such as gold, silver, bronze, zinc, tungsten, molybdenum, stainless steel, titanium, nickel, chromium, silicon as well as metal alloys such as nickel and chromium alloys and even non-metals such as wood and graphite. Generally, metal powders are preferred. For dental restorations the preferred materials are ceramics, especially zirconium oxide or zirconia. The literature is replete with disclosures of the wide variety of available sinterable materials and methods for casting them into cast articles. See for example, P. Rado, "Slip-Casting of Non-clay Materials," British Ceramic Society, Transactions and Journal, 72(7), 291–297 (1973). The selection of the sinterable material to be employed for the slip casting of the final product is dictated almost entirely by the physical properties and appearance desired in the final product. The fundamental techniques employed in the heating of the final slip casting or powder compact (these terms are used interchangeably herein) date back to biblical times and are well documented in the literature. The only requirement of the sinterable powder used in the practice of this invention is that after production and heating of the compacted powder in the same manner as was employed in determining its coefficient of shrinkage, the final casting will have the desired physical and dimensional properties.

The amount of shrinkage that will occur upon the heating of any given sinterable powder is preferably determined experimentally, to permit accurate measurement and comparison of the dimensions of the powder compact (molded sinterable powder) relative to the dimensions of the final solid sintered casting. When establishing the coefficient of shrinkage for a given sinterable system each of the factors listed above for the determination of the coefficient of shrinkage must be noted carefully so that the result obtained can be reproduced accurately.

In accordance with conventional slip casting procedures the sinterable powder is mixed with a suitable liquid which can be water or an organic liquid and then packed into a preferably porous mold. After the liquid has evaporated or migrated into the mold, the powder compact, or slip casting, is removed and fired to produce the desired solid article. The amount of liquid employed is a factor, which must be taken into account along with other factors in determining the coefficient of shrinkage of the sinterable composition. Of particular importance is the size of the sinterable powder particles, which establish the bulk density or packing density of the powder compact. It is important to avoid the use of packing densities, which are too low, which can result in warpage or other dimensional distortions when the slip casting is fired.

ii. The swellable polymer

Any polymer that is capable of being swelled in an essentially uniform manner and to a reproducible extent can be used in the practice of this invention, provided the polymer is insoluble in the swelling agent system selected for swelling the polymer and provided also that after immersion in the swelling agent, the swelled polymer retains sufficient structural integrity to permit its use in the molding procedures employed in the practice of this invention. The ratio of the dimensions of an unswollen polymer to the same polymer after immersion in a specified swelling agent system at a given temperature for a specific period of time is hereinafter referred to as the "coefficient of expansion."

A wide variety of different polymers are capable of use in the practice of this invention. The most readily available polymers, which are capable of being reproducibly swelled, without dissolving, are elastomeric polymers and crosslinked polymers. Among the useful polymers having the properties desired for accurate dimensional slip casting are elastomers, as for example: silicone elastomers, polyurethane elastomers, vulcanized natural latex, polysulfide elastomers and polyether elastomers. Other examples of useful swellable polymers are thermoplastic polyurethanes, styrene/butadiene/styrene block copolymers, styrene/ethylene-butylene/styrene block copolymers, polyether/polyamide copolymers, ionic polymers and a variety of plastic/rubber alloys. These polymeric materials are well known and are readily available from a multitude of commercial suppliers. The preferred swellable polymers useful according to this invention are elastomers, more preferably silicone elastomers and most preferably RTV silicones.

iii. The swelling agent system

Virtually any organic liquid can be used in the practice of this invention, provided that it is essentially non-reactive with the swellable polymer selected for use in accordance with the invention and provided also that it does not dissolve the swellable polymer. Mixtures of various swelling agents are particularly useful due to the possibility of adjusting the ratio of a plurality of different swelling agents having different swelling effects on the swellable polymer so as to obtain a specific desired ratio between the coefficient of expansion and the coefficient of shrinkage of the sinterable material selected.

If the swellable polymer selected is a hydrophilic polymer, water as well as aqueous solutions of salts and other substances such as alcohols and esters, which are miscible in water, can also be used as the swelling agent system employed in the practice of this invention.

The extremely wide range of possible swelling agent systems that are capable of use in accordance with invention allows the selection of the swelling agent system to be largely a matter of choice. Considerations such as cost, flammability and waste disposability may therefore represent the most important factors in the selection due to the fact that there are many different swelling agent systems that can be used to achieve the desired coefficient of expansion. Because the temperature and the duration of the immersion of the selected polymer all have an influence of the degree of swelling of the polymer, it is necessary to determine the coefficient of expansion by experimentation, if accurate dimensional and/or proportional replica is to be achieved. The procedure for making this determination is quite simple:

i) A cylindrical casting of the polymer selected for use is cut into discs of uniform thickness.

ii) The individual discs are then immersed in a representative variety of different swelling agent candidates maintained at a desired temperature.

iii) The specimen discs are periodically removed and measured to establish the degree of swelling of the individual discs over time to thereby establish the coefficient of expansion for the various swelling agent systems employed in the experiment.

The thickness measurements will establish the rate of swelling and the length of time sufficient to allow essentially complete penetration of the selected swelling agent system into the specimen discs. This will provide an indication of the time required to achieve essentially maximum or near maximum expansion of the selected swellable polymer in a reproducible manner. Normally this period of time is on the order of 8 to 128 hours at room temperature.

An important feature of this invention resides in the use of combinations of swelling agents, which can used to produce a ratio of swelling which is different from that of individual pure swelling agents. This is important because it is very unlikely that any single pure swelling agent will provide a degree of swelling which will be the precise ratio of swelling needed to compensate for the coefficient of shrinkage of the selected sinterable composition or to provided a final solid product of the desired size. The use of such swelling agent mixtures permits the adjustment of the coefficient of expansion of the selected swellable polymer to very precisely compensate for the coefficient of shrinkage of the sinterable material selected. The ideal swelling agent combinations that allow for such precise adjustments are mixtures of a swelling agent that has little or no ability to cause the selected polymer to swell, such as triglyme or tetraglyme, with another swelling agent that has a considerable ability to cause the selected polymer to swell, such as limonene. By testing a series of mixtures of such combinations and plotting a curve of the results obtained in graphical form, a very satisfactory curve can be produced which will allow the selection of swelling mixture, by interpolation if need be, for the selected polymer which will very precisely compensate for the coefficient of shrinkage of the selected sinterable composition. FIG. 1 was drawn from data produced in Example 1 below and illustrates such a curve.

FIG. 1 is a graphical representation of the determination of the coefficient of swelling of an RTV silicone elastomer (Quick Pour Duplicating Material, a product of Ceramco, Inc., Burlington, N.J.) determined by the method described above, by immersion in mixtures of tetraglyme and limonene in the various ratios indicated, at a temperature of 23 degrees centigrade for a period of 26 hours. The swelling experiments demonstrate the ease of selecting a swellable polymer and protocol using various swelling agent systems, which are capable of providing coefficients of swelling extending over a range of slightly above 1.0 to 1.42.

The following is a listing of pure swelling agents ranked in the order of their power to cause swelling of a RTV silicone polymer:

| Pure swelling agent | Thickness Ratio after immersion |
|---|---|
| limonene | 1.51 |
| turpentine | 1.49 |
| mineral spirits | 1.42 |
| dichloromethane | 1.42 |
| toluene | 1.42 |
| ethyl acetate | 1.41 |
| 2-butanone | 1.24 |
| acetone | 1.10 |
| 2-methoxy ether | 1.08 |
| sulfolane | 1.04 |
| N,N-dimethylformamide | 1.03 |
| dimethylsulfoxide | 1.03 |
| furfuraldehyde | 1.03 |
| triglyme | 1.02 |
| tetraglyme | 1.01 |

Mixtures of the swelling agent materials are especially useful as they make it possible to achieve a variety of different coefficients of expansion, by employing different swelling agent systems with a selected swellable polymer. This makes it possible to achieve a more accurate balance between the coefficient of expansion of the polymer selected and the coefficient of shrinkage of the sinterable powder composition selected for the replica.

An important factor in the selection of the swelling agent system to be used in accordance with the process is the rate at which swelling agent evaporates from the swelled polymer specimen as this property is determinative of the time allowed for producing a mold of the swelled specimen before swelling agent evaporation begins to cause shrinkage of the polymer back to its original size. Swelling agents that evaporate rapidly, such as dichloromethane and toluene are less favored because their rapid rate of evaporation reduces the amount of time available for producing the casting mold.

To ensure a high degree of accuracy in the production of a shaped article replica it is preferable to make a fresh determination of the coefficient of expansion for each new batch of swellable polymer selected due to the possible variations in the coefficient of expansion resulting from differences which can occur due to subtle batch to batch variations.

iii. The procedure

Accurate replication of a complex shaped article having at least one dimensionally accurate surface adapted to mate with a mating surface of a second shaped article, can be accomplised utilizing the following procedural steps:

i) Choose a sinterable powder;

ii) Determine the heating schedule and other conditions, which are to be used in heating the sinterable powder to produce a solid replica.

iii) Prepare a test piece of the selected sinterable composition and take measurements before and after heating in accordance with the heating schedule and conditions to be used in the final step to thereby determine the coefficient of shrinkage for the sinterable composition using the selected heating protocol.

iv) Select a swellable polymer and swelling agent system and conditions, such that the polymer and swelling protocol will result in a coefficient of expansion that essentially compensates for the shrinkage of the sinterable composition selected in step 2 above, when heated. To achieve such equivalence, the coefficient of expansion for the selected polymer should be equal to 1 divided by the coefficient of shrinkage of the sinterable selected for use in step 1 above. In other words the mathematical relationship between these two measures should satisfy the following equation:

Coefficient of Expansion=1/Coefficient of Shrinkage.

This step may require a minor amount of experimentation to empirically define the swelling agent system; temperature and duration of immersion needed to obtain the desired coefficient of swelling. Because very slight variations in the composition of the selected swellable polymer can result in significant differences in the coefficient of swelling, it is preferable to determine the coefficient of swelling for each batch of swellable polymer composition used in order to ensure accuracy.

v) Use the selected swellable polymer chosen in step (iv) to produce a cavity model of all or a portion of said second shaped article, including a mating surface thereof;

vi) create an enlarged cavity model by swelling said cavity model to a predetermined extent by immersing it in the swelling agent system chosen in step (iv) at a pre-selected temperature and for a predetermined period of time;

vii) fill the enlarged cavity model with a casting mixture and allow the casting mixture to cure to produce a solid enlarged replica of all or a portion of said second shaped article;

viii) cover the mating surface of said enlarged replica with molten wax and optionally add and shape additional wax thereon;

ix) after the wax has hardened, separate the resulting wax model from the enlarged replica;

x) use the separated wax model to produce a slip casting mold;

xi) fill the slip casting mold with the sinterable powder compact composition chosen in step (i) [whose coefficient of shrinkage is essentially equal to the coefficient of expansion of the swellable polymer when immersed in the swelling agent system employed in step b) under the conditions set forth therein];

xii) after the sinterable powder compact has hardened, remove the slip casting mold from around the sinterable powder compact; and xiii) heat the sinterable powder compact in accordance with a predetermined heating schedule to produce a solid shaped article having at least one dimensionally accurate mating surface.

iv. Examples

EXAMPLE 1

Determination of Coefficient of Swelling

Cylindrical samples of an addition cureable vinyl polydimethylsiloxane RTV elastomer (Quick Pour Duplicating Material sold by Ceramco Inc., Burlington, N.J.) were prepared by mixing equal weights of the catalyst and silicone base material. The thoroughly mixed blend was poured into a cylindrical mold cavity (12.1 mm Diameter by 60 mm Length). The polymer contained in the cylinder was allowed to cure for approximately thirty minutes and was then removed from the cylinder cavity using a die plunger and arbor press. 6–8 mm Thickness samples were sliced from the solidified polymer samples using a razor blade. The finished specimens were all right cylinders measuring 12.07 mm in diameter and ranging from 6 to 8 mm in thickness. The specimens were allowed to cure for a period of 24 hours before proceeding to the next step.

Mixtures of limonene and tetraglyme as well as mixtures of triglyme and limonene swelling agents were prepared gravimetrically from the pure swelling agents and placed in high density polyethylene containers with screw closures. The range of swelling agent samples prepared included pure limonene pure tetraglyme and also mixtures of 20%, 40%, 60% and 80% tetraglyme, the remainder being limonene. Two cylindrical samples of polymer were placed in each of the containers and allowed to equilibrate at 23° C.±2° C. for 24 hours.

The samples were removed from the container and blotted dry with a tissue. The diameter of each specimen sample was measured with an electronic caliper by slowly opening the jaws of the caliper until the sample fell free of the caliper by its own weight. This measurement was repeated for each of the specimen samples that had been immersed in swelling agent as well as a standard unswollen polymer sample. The diameters of the two samples immersed in each of the different swelling agents and swelling agent mixtures were averaged and the coefficient of swelling resulting from immersion in each of the different swelling agent compositions calculated by determining the ratio of the diameter of the swelled specimen to that of the unswollen standard.

The following results for various mixtures of tetraglyme and limonene were obtained by these procedures:

Tetraglyme/Limonene Swelling Agent Mixtures

| % Tetraglyme | % Limonene | Swelling Ratio |
|---|---|---|
| 0.0 | 100.0 | 1.425 |
| 20.0 | 80.0 | 1.330 |
| 40.0 | 60.0 | 1.218 |
| 60.0 | 40.0 | 1.130 |
| 80.0 | 20.0 | 1.067 |
| 100.0 | 0.0 | 1.012 |

The values obtained for tetraglyme limonene systems were plotted as shown in FIG. 1. FIG. 1 is a graphical representation of the coefficients of swelling set forth above. This graphical representation of the specified systems makes it possible to interpolate between the measured values to obtain a swelling agent system, which will provide any desired coefficient of swelling falling within the overall range. Thus, if for example a swelling system having a 1.35 coefficient of expansion is needed, interpolation based on FIG. 1 shows that a mixture of 84 percent limonene and 16 percent tetraglyme will provide the desired coefficient.

EXAMPLE 2

Determining the Coefficient of Shrinkage

A slip mixture of zirconium oxide and water was prepared from 16.00 g zirconium oxide powder (TOSOH Zirconia TZ-3YS powder) and 4.00 g distilled water. After thorough mixing with a plastic spatula, the mixture was allowed to stand for 5 minutes to allow air bubbles to escape. Two castings were made in each of a number of Plaster of Paris cavity molds of dental onlays of different sizes, by rapidly filling the cavity molds with the slip mixture, using a disposable plastic pipette. The castings were allowed to stand for approximately 5 seconds (this allowed the wall thickness of the cast piece to reach a satisfactory level), after which time any excess slip mixture was removed. Castings of rectangular plates were also made using rectangular molds which measured 30 mm by 34 mm by 6 mm. In all cases the resultant powder compacts (slip castings) were left in the mold for approximately ten minutes prior to removal. The unfired zirconia castings were placed on an alumina insulation blocks and allowed to air dry for approximately 12 hours.

The unfired zirconia castings, supported on an alumina insulation blocks, were placed in a high temperature furnace (Thermolyne High Temperature Furnace—maximum temperature 1700 C.) and fired in an air atmosphere. The heating schedule was as follows:

1. Heat to 500° C., increasing temperature at a rate of 1° C. per minute with no hold at 500° C.
2. Heat from 500° C. to 1500° C. increasing temperature at a rate of 2° C. per minute with a 2 hour hold at 1500° C.
3. Cool to room temperature at a temperature reduction rate of 4° C. per minute.

After the fired castings had cooled, their length and breadth was carefully measured and the ratio of the size of the casting to the original model determined. From these measurements it was determined that the coefficient of firing shrinkage of the zirconia ceramic slip was 0.773±0.009, based on 6 replicas.

EXAMPLE 3

Preparing a Dental Stone Cast

A dental stone cast die of an impression of a molar tooth prepared to receive an onlay was made from an RTV silicone impression of the molar tooth prepared by conventional techniques. The stone cast (die) was mounted on a tapered pin and trimmed, making certain that all margins were exposed. The gingival area was also trimmed so that it was smooth and slightly tapered.

EXAMPLE 4

Preparing the Cavity Model

A cavity model of the prepared molar tooth was made by immersing the dental stone die in RTV silicone impression material (Quick Pour Duplicating Material, Ceramco, Inc., Burlington, N.J. comprised of equal amounts, by weight, of catalyst and base) contained in a 15 ml plastic beaker. The die was held in position until the RTV impression material was cured. The die was removed from the RTV impression material after which the RTV cavity model was also removed from the beaker. The outer walls of the cavity model were trimmed with a razor to a thickness of approximately 1 mm.

EXAMPLE 5

Cavity Model Enlargement

The cavity model prepared in example 4 was immersed in a swelling system mixture comprised of 25.5% by weight tetraglyme and 74.5% by weight of limonene for a period of 24 hours. This swelling system and protocol had been previously determined to provide a coefficient of swelling for RTV silicone impression material used for fabrication of the RTV cavity model which would exactly compensate for the coefficient of shrinkage of the ceramic composition selected for production of the final solid onlay. This determination was made by the procedure described in Examples 1 and 2 above.

EXAMPLE 6

Preparing the Cavity Die

The swelled cavity model produced as described in Example 5 was removed from the swelling system mixture and blotted dry with tissue. A casting mixture of phosphate bonded investment compound (Den-Mat Refractory 20 and investment liquid, Den-Mat Corporation, Santa Maria, Calif.) was prepared and poured into a plastic cylinder (24 mm diameter by 40 mm high). The swelled cavity model was carefully filled with the investment casting mixture and was then inverted and pressed into the casting mixture inside the plastic cylinder. The investment was allowed to harden over a period of 8 hours after which the swelled cavity model was removed from around the investment cast die, which was then in the form of an enlarged proportionately accurate replica of the original cavity preparation. The enlarged cavity die was trimmed to remove flash and painted with separating medium.

EXAMPLE 7

Preparing the Enlarged Wax Onlay

The cavity portion of the enlarged die prepared as described in Example 6 was filled with molten inlay wax (Dr. Peck's Inlay Wax, Zahn Dental Co. Inc., Taunton Mass. 02780). Buildup with molten wax was continued until the entire anatomical surface of the enlarged molar onlay had been built to the desired size, covered and its surface sculpted to provide the desired occlusal surface configuration. The thus enlarged wax onlay was then carefully removed from the enlarged investment die.

EXAMPLE 8

Preparing the Slip Casting Mold

A conventional technique for preparing lost wax metal casting molds was used for the preparation of the slip casting mold. The wax onlay was placed on edge and attached to one large wax sprue (average diameter approximately 5 mm) which was in turn attached to a sprue base. A casting ring was placed around the sprue base. The mold assembly was filled with an investment having the composition of the material described in example 4 of U.S. Pat. No. 4,883,621. The mold was dried overnight and then slowly heated to a temperature of 460°–480° C. The mold was held at that temperature for a period of two hours to dry and weaken the mold and to burn out the wax pattern. The mold was then allowed to cool to room temperature. The sprue base was then removed.

EXAMPLE 9

Preparing the Slip Casting

An aqueous zirconia slip was prepared by thoroughly mixing 8.00 g of TOSOH Zirconia TZ-3YS powder and 2.00 g distilled water. The slip was allowed to stand for 5 minutes to remove air bubbles. A plastic pipette was used to introduce slip into the sprue hole of the mold. Slip was added repeatedly until slip level at the aperture of the sprue hole was no longer observed to drop. The mold was allowed to stand for 30 minutes after which time the soft investment surrounding the casting was removed. The sprue was cut from the onlay with a diamond wheel followed by contouring of the point of attachment to match the boundaries of the onlay.

EXAMPLE 10

Preparing the Onlay

The onlay was placed on an alumina support in a high temperature furnace (Thermolyne High Temperature Furnace—maximum temperature 1700 C.) where it was fired in an air atmosphere. The onlay was heated to 500 degrees C., increasing the temperature at a rate of 1 C. per minute with no hold at 500 C., followed by heating to 1500 C. at a rate of increase of 2 C. per minute, with a 2 hour hold at 1500 C. followed by a return to room temperature at a rate of 4 C. per minute. After completing this firing schedule, the onlay was fitted to the master model using conventional dental restoration techniques and was found to closely fit to the model with no apparent discontinuities.

While the above examples are directed to a method of producing shaped articles having at least one dimensionally accurate surface adapted to mate with a mating surface of a natural tooth, it will be appreciated that the method of this invention is useful in any application where the creation of an accurate mating surface is desired for whatever reason. This method is also particularly useful for the restoration of damaged works of art such as ceramics, metal and marble sculptures and the like where portions of the damaged work have either been lost or damaged making it highly desirable to be able provide an accurate mating surface in the restoration component to fit with the remaining portion of the original.

What is claimed is:

1. A method for producing a shaped article having at least one dimensionally accurate surface adapted to mate with a mating surface of a second shaped article, which comprises:

a) preparing a swellable polymer cavity model of all or a portion of said second shaped article, including a mating surface thereof;

b) create an enlarged cavity model by swelling said cavity model to a predetermined extent by immersing it in a swelling agent system at a pre-selected temperature and for a predetermined period of time;

c) fill the enlarged cavity model with a casting mixture and allow the casting mixture to cure to produce a solid enlarged replica of all or a portion of said second shaped article;

d) cover the mating surface of said enlarged replica with molten wax and optionally add and shape additional wax thereon;

e) after the wax has hardened, separate the resulting wax model from the enlarged replica;

f) use the separated wax model to produce a slip casting mold;

g) fill the slip casting mold with a sinterable powder compact composition whose coefficient of shrinkage is essentially equal to the coefficient of expansion of the swellable polymer when immersed in the swelling agent system employed in step b) under the conditions set forth therein;

h) after the sinterable powder compact has hardened, remove the slip casting mold from around the sinterable powder compact; and i) heat the sinterable powder compact in accordance with a predetermined heating schedule to produce a solid shaped article having at least one dimensionally accurate mating surface.

2. A method according to claim 1 above wherein said sinterable powder compact is a ceramic powder compact.

3. A method according to claim 1 wherein said shaped article having at least one dimensionally accurate surface adapted to mate with a mating surface of second shaped article is a dental onlay or inlay.

4. A method according to claim 1 wherein said swellable polymer is an elastomer.

5. A method according to claim 1 wherein said swellable polymer is a silicone elastomer.

6. A method according to claim 1 wherein said swellable polymer is an RTV silicone polymer.

7. A method according to claim 1 wherein said swelling agent system is a liquid or a mixture of liquids which does not react with or dissolve said swellable polymer.

8. A method according to claim 1 wherein said swelling agent system is an organic liquid or a combination of two or more organic liquids.

9. A method according to claim 1 wherein said swelling agent system is a mixture of limonene and triglyme or tetraglyme.

10. A method according to claim 1 wherein said sinterable powder compact is comprised of a ceramic powder.

11. A method according to claim 1 wherein said sinterable powder compact is zirconia.

12. A method according to claim 1 wherein said sinterable powder compact is a metal powder.

13. An improved method for producing a solid shaped article having at least one surface adapted to mate with a mating surface of a second shaped article, by producing an enlarged cavity mold to compensate for shrinkage of a sinterable powder compact produced in said mold, wherein the improvement comprises producing said enlarged cavity mold by a procedure which includes enlarging a swellable polymer casting mold of said second shaped article by immersion in a swelling agent system formulated to enlarge said casting mold to an extent essentially equal to the shrinkage which occurs upon heating of a sinterable powder compact made therein or in a solid replica thereof.

* * * * *